Figure 1:
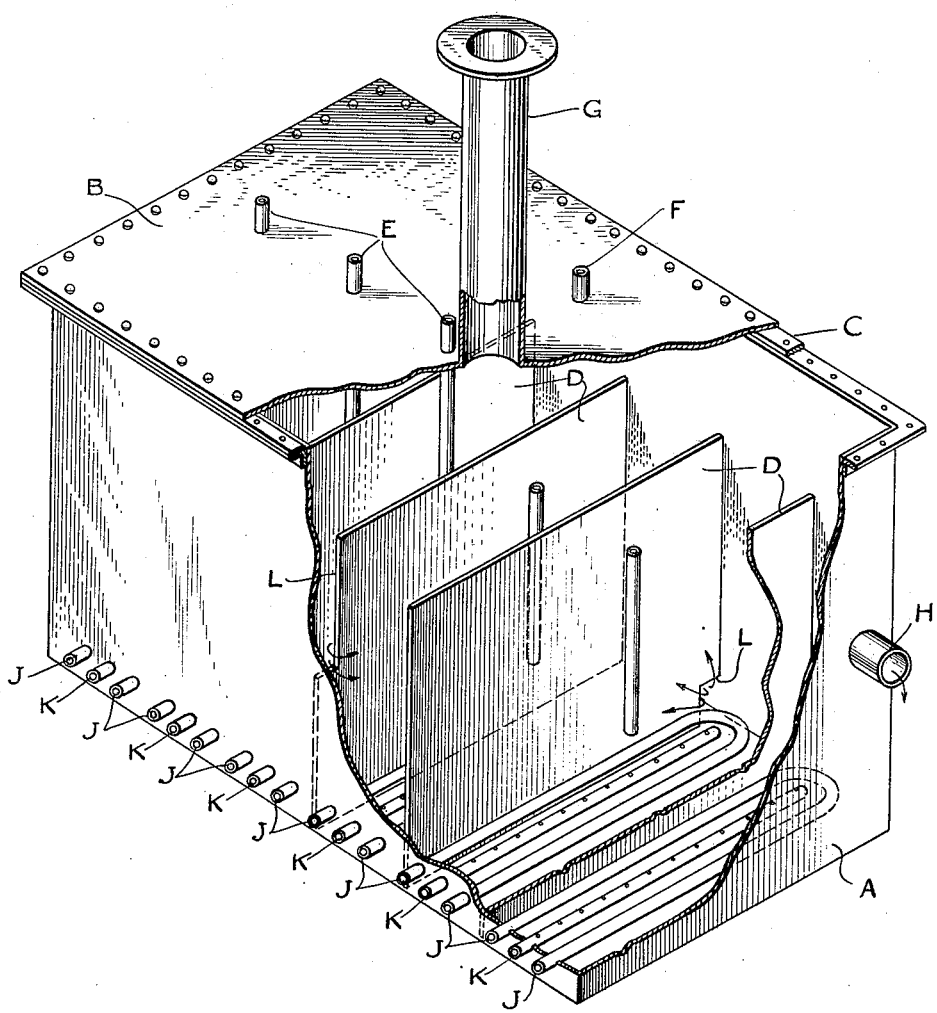

June 30, 1953  W. E. CASH ET AL  2,644,009
CONTINUOUS ESTERIFICATION PROCESS
Filed Oct. 6, 1949  3 Sheets-Sheet 2

INVENTORS.
WILFRED ERNEST CASH.
WILLIAM HENRY GELL.
BY
their ATTORNEYS.

June 30, 1953 W. E. CASH ET AL 2,644,009
CONTINUOUS ESTERIFICATION PROCESS
Filed Oct. 6, 1949 3 Sheets-Sheet 3

INVENTORS.
WILFRED ERNEST CASH.
WILLIAM HENRY GELL.
BY Ward Crosby & Neal
their ATTORNEYS.

Patented June 30, 1953

2,644,009

UNITED STATES PATENT OFFICE 2,644,009

CONTINUOUS ESTERIFICATION PROCESS

Wilfrid Ernest Cash, Cheam, and William Henry Gell, Hull, England, assignors to The Distillers Company Limited, Edinburgh, Scotland, a British company Application October 6, 1949, Serial No. 119,844
In Great Britain October 15, 1948

10 Claims. (Cl. 260—475)

1

The present invention relates to the esterification of monohydric alcohols with relatively non-volatile organic acids and has as one object the provision of a process whereby such esterifications may be conducted continuously to give an ester of very low organic acid content.

A further object is the provision of an apparatus wherein such an esterification process may be carried out.

The usual batch method of esterifying an alcohol comprises mixing the reactants in a vessel, preferably with an excess of the alcohol, in the presence of an esterification catalyst such as sulphuric acid or p-toluene sulphonic acid, and heating to the boiling point, which is limited at ordinary pressure by the water liberated by the reaction. This water then distils out, either as an azeotrope or mixture with a volatile component or product of the reaction, or with an entraining agent such as benzene which is incorporated to assist in its removal. Generally, the water is separated from the distillate and the other components are either returned to the still or removed to storage.

Continuous esterification procedures are known, but these have almost invariably involved the counter-current treatment of the acid and alcohol components in a tower which is filled with a packing or provided with bubble plates, and are therefore only applicable where one component is readily volatile at the reaction temperature and, in any case, involve operating with the volatile component in the vapour phase. Similarly, it is known to conduct the analogous alcoholysis reaction continuously in a tower, as exemplified by the counter-current treatment of amyl alcohol with methyl acetate vapour in the presence of sulphuric acid and the reconstitution of glycerides by counter-current treatment with the vapour of an alkyl ester of a higher fatty acid, but in such cases also one reactant must be in the vapour phase.

It has been proposed to react polyhydric alcohols continuously with fatty acids in a concurrent stream flowing through a succession of zones, corresponding substantially with the esterification of the hydroxyl groups of the polyhydric alcohol, while substantially completing the conversion of the successive hydroxyl groups in the respective zones, the aim being separately to control the stages of the reaction.

It has now been found that an improved control and increased throughput may be secured in the production of a neutral ester by esterification or alcoholysis of a monohydric alcohol with a relatively non-volatile organic acid, acid anhydride, acid ester or neutral ester of a relatively volatile alcohol by passing the reactants concurrently through a series of at least three heated zones, into which an entrainer is introduced.

2

By "relatively non-volatile" as applied to the second reactant is meant having a volatility sufficiently low to permit removal of the hydroxy compound, i. e. water or the alcohol produced without removing this reactant from the system. When the esterification reaction comprises reacting the monohydric alcohol with an organic acid, acid anhydride or acid ester the hydroxy compound produced will be water, and when the esterification reaction comprises reacting the monohydric alcohol with a neutral ester of a relatively volatile alcohol i. e. an alcoholysis reaction, the hydroxy compound produced will be the relatively volatile alcohol.

By "relatively volatile" as applied to the "relatively volatile alcohol" is meant more volatile than the first mentioned monohydric alcohol.

One of the main advantages of the process of this invention is that it enables the reaction temperature to be regulated and, in particular, raised as the reaction proceeds to completion, thereby lowering the time required and correspondingly increasing the throughput, while a further advantage is that the water produced during esterification, or the lower alcohol produced during alcoholysis, is directly removed from the system instead of being led back along the path of one of the reactants as in the case of counter-current contact. However, the advantages of counter-current contact may be maintained in the present process by adding more of the alcoholic component to the later zones, thereby ensuring a minimum of organic acid in the product. Thus, the reaction may be commenced with an excess of the organic acid, and monohydric alcohol added during the progress of the reaction mixture through the successive zones until a slight or considerable excess is present in the effluent, though an excess of the alcohol throughout the system may be maintained if desired.

The entrainer employed to remove the water or alcohol from the esterification or alcoholysis mixture respectively, will depend in the usual way on the nature of the alcohol undergoing reaction. Thus, in the production by esterification of lower alkyl esters including butyl esters, it is most convenient to use the same alcohol as the entrainer, while with higher alcohols it is generally more convenient to use a separate entrainer such as an aromatic hydrocarbon of 6-8 carbon atoms. In the case of alcoholysis, where a low boiling alcohol is replaced by a higher boiling one, an inert gas may be blown through the reaction mixture or an azeotrope former may be added, the use of an inert gas being also suitable for esterifications. However, the particular entraining means employed does not form a critical part of this invention, and any of those used for the same reaction when conducted batchwise will generally be suitable.

Among the acids and anhydrides which can be esterified by the process of this invention may be mentioned phthalic acid, phthalic anhydride, sebacic acid, lactic acid, isovaleric acid, salicyclic acid, benzoyl-benzoic acid, maleic acid, maleic anhydride and stearic, citric, glutaric, malonic, adipic, and fumaric acids, while among the alcohols which can be esterified may be mentioned methyl, ethyl, propyl, butyl, amyl, hexyl, heptyl, octyl, nonyl and decyl alcohols, cyclohexanol, phenylethanol and methoxyethanol. Acid esters, such as the monoesters of any of the above-mentioned dicarboxylic acids may be esterified in the same way, and it is frequently convenient, when dealing with dicarboxylic acids or their anhydrides, to form the monoester first in a mixing zone in the presence of excess alcohol, and then lead the solution of monoester in alcohol to the succession of reaction zones. In the production of mixed esters, an acid ester of a different alcohol may be esterified.

The catalyst employed may be of the conventional type, and sulphuric acid is preferred, suitable concentrations being in the range 0.05-2% by weight and particularly 0.2-0.5% by weight.

A further feature of the present invention consists in an apparatus for effecting continuous esterification reactions, comprising a vessel, conveniently rectangular, divided by at least two partitions into at least three compartments communicating consecutively with one another, thereby providing a long path that the reaction mixture is constrained to follow from an inlet at one end of the vessel through each compartment to an outlet or overflow at the other. At least three of the compartments are provided with a heating means such as a steam coil, a perforated pipe or other means for the introduction of esterifying alcohol or other entrainer near the base, a vapour outlet and preferably a temperature-recording means. Conveniently, the partitions do not reach the roof of the vessel, and a common vapour pipe leads the vapours to a condenser where the water and entrainer are withdrawn for recovery if desired. It is preferred that the individual compartments should have a greater length than width.

An apparatus of this type is depicted in Figure 1 of the drawings, in which the rectangular vessel A, secured to the coverplate B and packing C, is provided with partitions as at D dividing the vessel into compartments, each of which is provided with steam coils J and perforated pipes K for introducing entrainer and/or alcohol. The partitions are cut away at alternate sides to provide a long path for the reaction mixture, as at L, the reaction mixture leaving the vessel through the outlet or overflow H and entering at an inlet (not shown) at the opposite end. Each compartment is provided with a temperature-registering means such as a thermometer (not shown) resting in the pockets E, and the cover plate B is provided with a pipe G for removing vapour and a connection F leading to a pressure-registering device, not shown.

Figure 2:
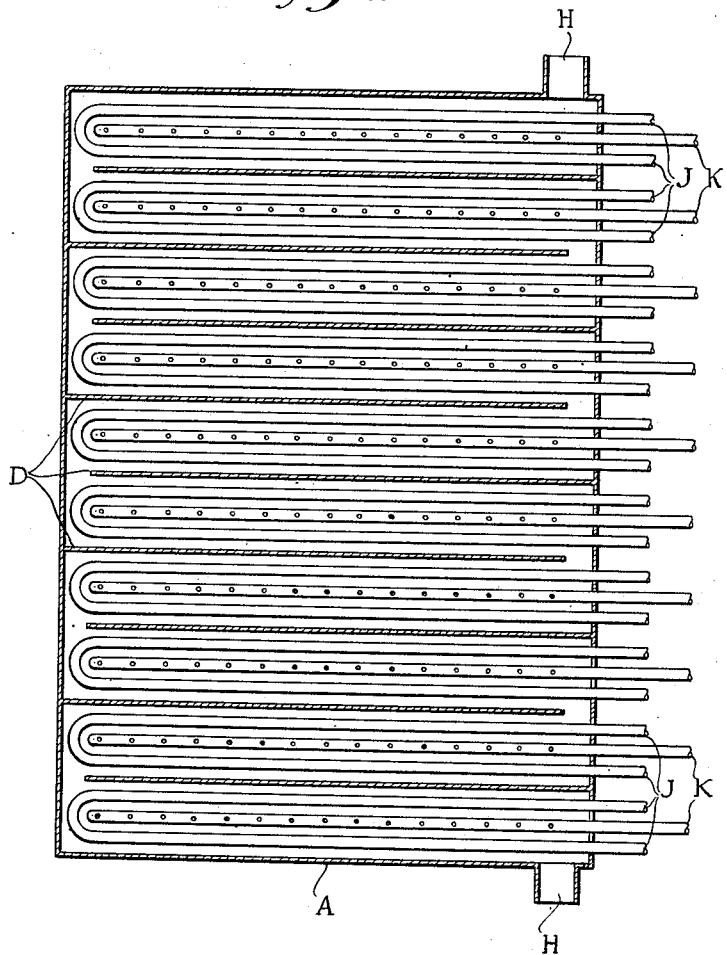

Figure 2 shows a plan of a similar vessel in which the partitions are replaced by baffles attached alternately to opposite sides; the baffles as at D do not extend completely across the vessel A, forming compartments provided with heating means as at J and entrainer-introducing means K; the fluid connecting tubes are shown at H. In an alternative embodiment the partitions or baffles permit the mixture to flow alternately under and over into the succeeding compartment.

Figure 3:
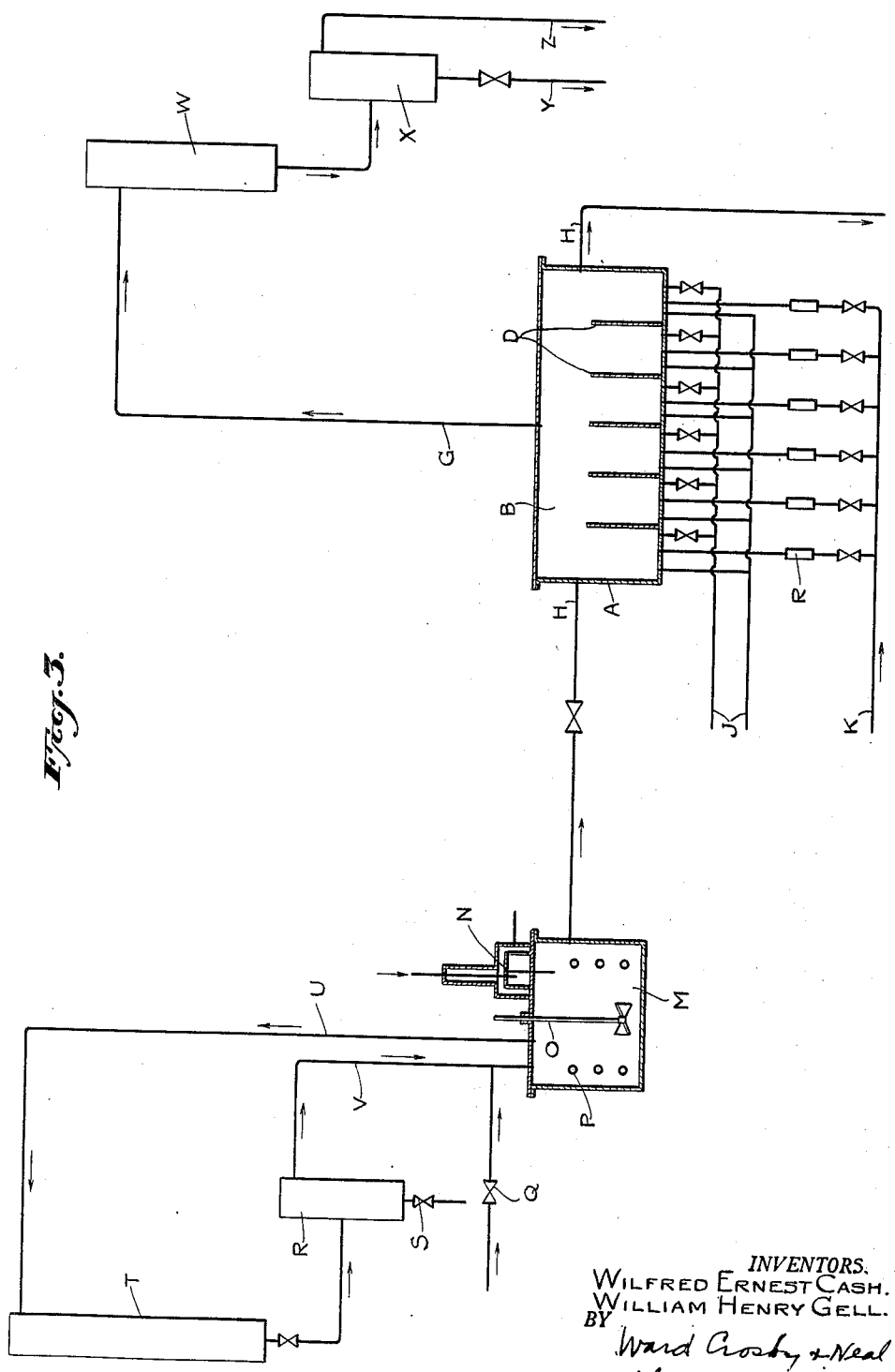

Figure 3 is a diagrammatic representation of a plant suitable for the production of say, dioctylphthalate from octanol and phthalic anhydride with an auxiliary water entrainer such as benzene. In operation, octanol from storage (not shown) enters the mixing vessel M via the valve Q, and molten phthalic anhydride enters the vessel from vapour trap N (which may be a conventional U trap if desired). The resulting mixture is stirred by agitator O and heated by steam coils P, and any water-octanol mixture which distils is led through pipe U to condenser T from which the liquid mixture flows to separator R, the upper octanol layer flowing through pipe V back to the mixing vessel and the lower water layer passing out through valve S.

It is generally convenient to add the catalyst (for example sulphuric acid) to the octanol prior to its admission to the mixing vessel where rapid conversion to the monoester takes place and, to avoid the necessity for jacketed pipes in conveying the monoester to the esterification vessel A, it is desirable to use at least two moles of the alcohol per mole of phthalic anhydride. However, the catalyst may be added at any point prior to or in the esterification vessel. The partially esterified mixture then flows from the mixing vessel through the inlet H into one end of the esterification vessel A and follows the zig-zag path through this vessel between the baffles D, eventually leaving through the outlet H to storage or to a processing zone, not shown. In the esterification vessel, each compartment is provided with independent heating from the steam supply J, and with an entrainer feed from the manifold K, the flow between this manifold and the distribution tube in each compartment being regulated by a valve and a rotameter as at R.

The flow of the reaction mixture through the vessel and the rate of admission of steam and entrainer into the tubes at the base of each compartment are regulated as desired, and the water-entrainer vapour from the common atmosphere above the compartments is withdrawn through pipe G in the cover-plate B of the vessel to condenser W. From this condenser the liquid water-entrainer mixture flows to separator X, the upper entrainer layer flowing to storage through pipes Z or circulating back to vessel A, and the reject water flowing out through valve Y.

A number of modifications can be made to this sequence to accommodate individual requirements or to take into account the somewhat different behaviour of other alcohols and acids. Thus, the initial mixing step may be effected batchwise or may even be dispensed with when employing liquid acids such as lactic acid, and when using volatile alcohols which are miscible with water an additional recovery step may be substituted for the separator X. Furthermore considerable alternations may be made to the esterification vessel without departing from the scope of this invention, and the use of a series of separate esterification units instead of a single partitioned vessel is envisaged. The upper limit to the number of compartments or units employed is not critical and is principally a matter of convenience, there being no particular advantage in employing, say, 100 such units instead of 10 if the contact time is maintained the same. Also, it is obviously not essential to have all the units heated and supplied with entrainer independently.

The following examples illustrate the production of esters according to this invention, employing an esterification vessel of the type represented in Figures 1 and 2.

EXAMPLE 1

A feed mixture was prepared from 100 lb. of phthalic anhydride and 32 gallons of 2-ethyl hexanol, corresponding to a 3:1 alcohol-acid mole ratio. The acid was first mixed with 21 gallons of the 2-ethyl hexanol and heated while stirring to effect solution, then allowed to cool and diluted with 11 gallons of the octanol containing sufficient sulphuric acid to give a total concentration of 0.2–0.3% by weight, the feed then containing approximately 31% w./w. of diester, 30% w./w. of monoester, and 39% w./w. of 2-ethyl hexanol.

The esterification vessel, which contained six compartments and was constructed as shown in Fig. 1, was then filled to a convenient level with 15 gallons of the feed, and heated by means of steam coils to 140–150° C. while introducing benzene into each compartment until the organic acidity fell to 0.5% w./w. calculated as phthalic acid. This preliminary batch esterification took several hours, and at the end of this time the feed was introduced continuously at one end of the vessel and the product was withdrawn through an overflow at the other end, the temperature being maintained at an average of 140–150° C. and the benzene being introduced uniformly into compartments 2–6.

Table 1 shows the result of one such run.

Table 1

| | |
|---|---|
| Reaction volume—gals | 11 |
| Feed, gals. per hour | 0.83 |
| Percent w./w. monoester in feed | 35.5 |
| Residence time—hours | 13.2 |
| Average liquid temp. °C | 141 |
| Lbs. of dioctyl phthalate produced per reaction volume per hour | 0.53 |
| Lbs. of benzene circulated per lb. of dioctyl phthalate produced | 6.65 |
| Lbs. of octanol per lb. of dioctyl phthalate in product | 0.33 |
| Organic acidity of product as percent w./w. phthalic acid on dioctyl phthalate | 0.41 |
| Percent of phthalic anhydride esterified | 98.08 |

A typical progress of esterification through the esterification vessel is represented in Table 2 for a test run, the acidity determinations having been made on samples withdrawn through sampling tubes mounted in the side of the vessel.

Table 2

| Sample of— | Feed | Compartment— | | | Product |
|---|---|---|---|---|---|
| | | 1 | 3 | 5 | |
| Organic acidity of w./w. phthalic acid | 15.9 | 3.6 | 1.4 | 0.55 | 0.4 |
| Percent of phthalic anhydride esterified to diester | 26.0 | 83.0 | 93.0 | 97.5 | 98.1 |

EXAMPLE 2

An arrangement similar to that of Example 1 was employed but in this case the esterification of the feed was effected in only three stages. Table 3 gives the results of two runs, and shows the somewhat higher acidity of the product compared with that obtained in Example 1 and with a similar benzene circulation and throughput.

Table 3

| Run No | 1 | 2 |
|---|---|---|
| Reaction volume, gallons | 7.5 | 7.5 |
| Monoester feed, gals./hour | 1.7 | 2.5 |
| Percent w./w. of monoester in feed | 42.8 | 26.3 |
| Residence time, hours | 4.4 | 3.0 |
| Average reaction temp., °C | 142 | 137 |
| Lbs. of dioctyl phthalate produced per gallon reaction volume/hour | 1.61 | 2.37 |
| Lbs. of benzene circulated per lb. of dioctyl phthalate produced | 2.03 | 1.70 |
| Lbs. of ethyl hexanol per lb. of dioctyl phthalate in product | 0.33 | 0.33 |
| Acidity of product as percent w./w. of phthalic acid on dioctyl phthalate | 0.48 | 0.73 |
| Percent of phthalic anhydride esterified | 97.74 | 96.56 |

EXAMPLE 3

Using a plant substantially as depicted in Fig. 3 but with a butanol recovery unit in place of separator X, a feed was prepared from one molecular proportion of phthalic anhydride and 2.1 molecular proportions of butanol containing sufficient sulphuric acid to give a total concentration of 0.2–0.3% by weight. The mixing vessel M was of 10 gallons capacity, maintained at a temperature of about 135° C. and reflux was normally less than 1 gallon per hour.

From the mixing vessel, the feed was led direct to a 6-compartment esterification vessel maintained at an average temperature of about 145° C. Butanol and water distilled from the vessel and the homogeneous condensate from condenser W (Fig. 3) was led to a distillation zone for butanol recovery.

Run 1 of Table 4 shows the results of a typical experiment using this procedure, while runs 2 and 3 show the results of similar experiments in which the feed was prepared in batches from one mole of phthalic anhydride to 2.1 moles of butanol and 0.2–0.3% w./w. of sulphuric acid. In each case the reaction volume was 15 gallons.

Table 4

| Run No | 1 | 2 | 3 |
|---|---|---|---|
| Feed (gallons per hour) | 3.5 | 2.1 | 2.3 |
| Percent w./w. of monoester in feed | 31.0 | 54.1 | 50.5 |
| Residence time (hours) | 4.0 | 7.1 | 6.5 |
| Average reaction temp., °C | 147 | 147 | 147 |
| Lbs. of dibutyl phthalate prod. per gal. of reaction vol./hour | 2.1 | 1.41 | 1.54 |
| Lbs. of butanol circulated per lb. of dibutyl phthalate prod | 0.71 | 1.31 | 0.97 |
| Lbs. of butanol per lb. of dibutyl phthalate in the product | 0.18 | 0.15 | 0.13 |
| Organic acidity of product as percent w./w. phthalate acid on dibutyl phthalate | 0.77 | 0.36 | 0.31 |
| Percent of phthalic anhydride esterified | 97.5 | 98.8 | 98.9 |

The temperature distribution in the compartments during a single run similar to No. 1 of Table 4 is shown in Table 5.

Table 5

| Time from commencement | Temperature °C., Esterification compartments | | | | | |
|---|---|---|---|---|---|---|
| | 1 | 2 | 3 | 4 | 5 | 6 |
| 19 hours | 105 | 141 | 148 | 150 | 146 | 147 |
| 24 hours | 107 | 145 | 150 | 151 | 151 | 149 |

EXAMPLE 4

A feed mixture was prepared from nonanol and phthalic anhydride in the molar ratio of 3:1 by heating and stirring for 2 hours, cooling and adding 0.3% by weight of sulphuric acid. This was then led to an esterification vessel of the type depicted in Fig. 1 with a reaction-liquid volume of 11 gallons and reacted substantially as Example 1, the average temperature being 150° C. and the feed throughput and benzene circulation rates being maintained at approximately 3 gallons per hour. The results of a typical run are given in Table 6.

Table 6

| | |
|---|---|
| Monoester in feed, percent | 34.1 |
| Residence time (hours) | 4.0 |
| Lbs. dinonyl phthalate produced per gallon of reaction volume per hour | 1.88 |
| Lbs. of benzene circulated per lb. of dinonyl phthalate produced | 1.32 |
| Lbs. of nonanol per lb. of dinonyl phthlate in product | 0.34 |
| Organic acidity of product as percent w./w. phthalic acid on dinonyl phthalate | 0.53 |
| Percent of phthalic anhydride esterified | 97.0 |

EXAMPLE 5

A feed was prepared from phthalic anhydride and methanol in the molar proportions of 1 to 3, the mixture being refluxed until solution of the former in the latter was achieved. Sulphuric acid was added to give a concentration of 0.3% by weight and the mixture was fed to the 6-compartment reactor substantially as described in Example 3. The results of a typical run are given in Table 7, the di-methyl phthalate being referred to as D. M. P.

Table 7

| | |
|---|---|
| Reaction volume—gals | 15 |
| Total monoester feed—gals | 18 |
| Monoester feed—gals./hour | 0.78 |
| Percent monoester in feed (average) | 46.3 |
| Residence time—hours | 22 |
| Average reaction temperature, ° C | 146 |
| Lbs. D. M. P. produced/gal. reaction vol./hr. | 0.47 |
| Lbs. methanol circulated/lb. D. M. P. produced | 2.3 |
| Lbs. methanol/lb. D. M. P.—in product | .036 |
| Acidity of product as percent by weight phthalic acid calculated on actual D. M. P. content | 0.7 |
| Percent phthalic anhydride esterified | 98.4 |

In this esterification methanol was used as entrainer, the water of reaction and that originally contained in the reactants passing directly to the condenser as aqueous methanol and from thence to storage for subsequent reconcentration.

EXAMPLE 6

Dibutyl sebacate was prepared by a process similar to that described in Example 3 for dibutyl phthalate. The feed mixture was prepared by refluxing 1 mole of sebacic acid with 2 moles of butanol and adding 0.3% by weight of sulphuric acid; with a residence time of 2 hours, the conversion of the sebacic acid to the dibutyl sebacate was 99.5%.

The products of the process of this invention consist in the neutral ester, a very small amount of incompletely esterified acid, excess alcohol, catalyst and possibly traces of water and any auxiliary entrainer. They are essentially similar to the products of carefully conducted batch esterification and may be worked up by the methods well known in the art, for example, by neutralisation with an alkali such as sodium hydroxide or carbonate, water washing and steam distillation or fractionation.

We claim:

1. A process for the production of an ester which comprises passing a mixture of a monohydric alcohol and an organic reagent together with an esterification catalyst concurrently through a series of consecutive reaction zones of which at least three are separately heated, said reagent being sufficiently non-volatile to permit removal of the hydroxy compound produced by the esterification of the alcohol with the reagent without removal of said reagent, said reagent being selected from the group consisting of acids, acid anhydrides, acid esters and neutral esters of relatively volatile alcohols, introducing fresh entrainer into said mixture in each of said heated zones and volatilizing and removing said hydroxy compound and entrainer from each reaction zone without passing the vapour thereof through the liquid reaction mixture in any other reaction zone.

2. A process for the production of an ester which comprises passing a mixture containing a monohydric alcohol, an organic acid ester and an esterification catalyst concurrently through a series of consecutive reaction zones of which at least three are separately heated, said organic acid ester being sufficiently non-volatile to permit removal of water produced by the esterification of the alcohol with the ester without removal of said organic acid ester, introducing fresh entrainer in said mixture in each of said heated zones, and volatilizing and removing said water and entrainer from each reaction zone without passing the vapour thereof through the liquid reaction mixture in any other reaction zone.

3. A process for the production of an ester which comprises mixing a monohydric alcohol, an organic acid and an esterification catalyst in a first mixing zone, said organic acid being sufficiently non-volatile to permit removal of water produced by the esterification of the alcohol with the acid without removal of said organic acid, passing the solution so produced through a series of consecutive reaction zones of which at least three are separately heated, introducing fresh entrainer into said solution in each of said heated zones and volatilizing and removing said water and entrainer from each reaction zone without passing the vapour thereof through the liquid reaction mixture in any other reaction zone.

4. A process for the production of an ester which comprises mixing a monohydric alcohol and an organic acid anhydride and an esterification catalyst in a first mixing zone, said organic acid anhydride being sufficiently non-volatile to permit removal of water produced by the esterification of the alcohol with the anhydride without removal of said organic acid anhydride, passing the solution so produced comprising the monohydric alcohol and acid ester thereof through a series of consecutive reaction zones of which at least three are separately heated, introducing fresh entrainer into said solution in each of said heated zones and volatilizing and removing said water and entrainer from each reaction zone without passing the vapour thereof through the liquid reaction mixture in any other reaction zone.

5. A process as set forth in claim 4, wherein said monohydric alcohol is an aliphatic alcohol of at least five carbon atoms, and said entrainer is an aromatic hydrocarbon of 6–8 carbon atoms.

6. A process as set forth in claim 5, wherein said acid anhydride is phthalic anhydride.

7. A process as set forth in claim 6, wherein said alcohol is an octyl alcohol and said catalyst is sulphuric acid.

8. A process as set forth in claim 4, wherein said monohydric alcohol is an aliphatic alcohol of 1-4 carbon atoms and said entrainer is the monohydric alcohol to be esterified.

9. A process for the production of dibutyl phthalate which comprises dissolving phthalic anhydride and sulphuric acid catalyst in butyl alcohol in a first mixing zone, passing the solution so produced, comprising butyl acid phthalate and butyl alcohol, through a series of consecutive reaction zones of which at least three are separately heated, introducing butyl alcohol into said solution in each of said heated zones, and removing vapour from each reaction zone without passing such vapour through the liquid reaction mixture in any other reaction zone.

10. A process for the production of dibutyl sebacate which comprises dissolving sebacic acid and sulphuric acid catalyst in butyl alcohol in a first mixing zone, passing the solution so produced through a series of consecutive reaction zones of which at least three are separately heated, introducing butyl alcohol into said solution in each of said heated zones, and removing vapour from each reaction zone without passing such vapour through the liquid reaction mixture in any other reaction zone.

WILFRID ERNEST CASH.
WILLIAM HENRY GELL.

References Cited in the file of this patent

UNITED STATES PATENTS

| Number | Name | Date |
| --- | --- | --- |
| 1,854,731 | Beran | Apr. 19, 1932 |
| 1,960,855 | Sommer | May 29, 1934 |
| 2,246,264 | Pinkernelle | June 17, 1941 |
| 2,384,793 | Bruun et al. | Sept. 18, 1945 |
| 2,426,968 | Grub | Sept. 2, 1947 |
| 2,457,111 | Gresham | Dec. 28, 1948 |
| 2,460,083 | Harbaugh | Jan. 25, 1949 |